United States Patent
Chen et al.

(10) Patent No.: US 10,243,698 B2
(45) Date of Patent: Mar. 26, 2019

(54) CHANNEL CODING/DECODING METHOD FOR DATA EXCHANGE SERVICE, AND DEVICE

(71) Applicant: Huawei Technologies Co., Ltd., Shenzhen (CN)

(72) Inventors: Liang Chen, Xi'an (CN); Longyuan Luan, Shenzhen (CN); Fan Zhang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 101 days.

(21) Appl. No.: 15/197,373

(22) Filed: Jun. 29, 2016

(65) Prior Publication Data
US 2016/0308645 A1  Oct. 20, 2016

Related U.S. Application Data

(63) Continuation of application No. PCT/CN2013/090882, filed on Dec. 30, 2013.

(51) Int. Cl.
*H04L 1/00* (2006.01)
*H04W 4/70* (2018.01)

(52) U.S. Cl.
CPC .......... *H04L 1/0068* (2013.01); *H04L 1/0041* (2013.01); *H04L 1/0071* (2013.01); *H04W 4/70* (2018.02)

(58) Field of Classification Search
CPC ... H04L 1/0009; H04L 1/0003; H04L 5/0048; H04L 5/0053; H04L 5/0007
See application file for complete search history.

(56) References Cited

U.S. PATENT DOCUMENTS

| | | | |
|---|---|---|---|
| 6,289,217 B1 * | 9/2001 | Hamalainen | H04L 1/0001 455/425 |
| 6,704,898 B1 | 3/2004 | Furuskar et al. | |
| 2002/0022468 A1 * | 2/2002 | Yoon | H03M 13/23 455/403 |
| 2007/0237251 A1 | 10/2007 | Spencer | |

(Continued)

FOREIGN PATENT DOCUMENTS

| | | |
|---|---|---|
| CN | 1633052 A | 6/2005 |
| CN | 101567748 A | 10/2009 |

(Continued)

*Primary Examiner* — Jung H Park
(74) *Attorney, Agent, or Firm* — Slater Matsil, LLP

(57) ABSTRACT

Embodiments of the present invention provide a channel coding method for a data exchange service, and a device. The method includes: coding source data to generate a first bitstream, where a code rate of a data part of the source data is p, and p is less than ⅓; puncturing the first bitstream to generate a second bitstream; mapping, in an interleaved manner, the second bitstream to q bursts to generate q burst sequences, for modulation, where the second bitstream fully occupies each burst sequence of the q burst sequences, and q is an integer greater than 4; and sending the q modulated burst sequences to a receive end. In the embodiments of the present invention, a code rate of channel coding for a data exchange service is reduced, so that reliability of terminal data transmission can be improved at same power consumption or less power consumption.

12 Claims, 4 Drawing Sheets

(56) References Cited

U.S. PATENT DOCUMENTS

| | | | | |
|---|---|---|---|---|
| 2013/0034054 A1* | 2/2013 | Wu | ............... | H04L 27/2602 370/328 |
| 2013/0111305 A1* | 5/2013 | Wang | ............... | H03M 13/23 714/786 |
| 2014/0016721 A1* | 1/2014 | Xin | ............... | H04L 1/007 375/295 |
| 2014/0036934 A1* | 2/2014 | Buckley | ............... | H04L 1/007 370/474 |

FOREIGN PATENT DOCUMENTS

| | | | |
|---|---|---|---|
| CN | 101656580 | A | 2/2010 |
| EP | 1176725 | A2 | 1/2002 |
| WO | 03049295 | A1 | 6/2003 |
| WO | 2007139462 | A1 | 12/2007 |

\* cited by examiner

CHANNEL CODING/DECODING METHOD FOR DATA EXCHANGE SERVICE, AND DEVICE

CROSS-REFERENCE TO RELATED APPLICATIONS

This application is a continuation of International Application No. PCT/CN2013/090882, filed on Dec. 30, 2013, which is hereby incorporated by reference in its entirety.

TECHNICAL FIELD

The present invention relates to the communications field, and in particular, to a channel coding/decoding method for a data exchange service, and a device.

BACKGROUND

The Internet of Things (IOT), as an important part in a new generation of information technology, refers to a network in which various devices having particular sensing, computation, execution, and communication capabilities are deployed to acquire information of a physical world, information transmission, coordination, and processing are implemented by a network, and therefore interconnection between humans and objects, and between objects are implemented. It is generally considered that, the first stage of the Internet of Things is referred to as machine to machine (M2M), that is, implementation of free communication between machines. A communications service borne by a communications network (such as a mobile cellular network) is referred to as Machine Type Communication (MTC).

Generally, an MTC device, especially an MTC terminal device, is energy limited compared with common user equipment (UE), for example, an important application of the MTC terminal device is a smart meter. A smart meter is generally powered by a battery. In addition, in many cases, the MTC terminal device suffers a more severe path loss than the common UE. Still using the smart meter as an example, the smart meter is usually installed in a basement of a house or is isolated by a metal shell, and in this case, transmit power of the MTC terminal needs to be increased to ensure reliability of data transmission. However, an increase in transmit power shortens a battery life, which is therefore unfavorable to maintenance of the MTC terminal device.

Except for a relatively special communication environment of some MTC terminals, there is a case in which other mobile devices for wireless communication may be in a relatively poor communication environment. In this case, when an existing channel coding method for a data exchange service is used, reliability and coverage of data transmission cannot be ensured if terminal power is not improved.

SUMMARY

Embodiments of the present invention provide a channel coding/decoding method for a data exchange service, and a device, which can improve reliability and coverage of data transmission without increasing terminal power.

According to a first aspect, a channel coding method for a data exchange service is provided, including: coding source data to generate a first bitstream, where a code rate of a data part of the source data is p, and p is less than ⅓; puncturing the first bitstream to generate a second bitstream; mapping, in an interleaved manner, the second bitstream to q bursts to generate q burst sequences, where the second bitstream fully occupies each burst sequence of the q burst sequences, and q is an integer greater than 4; modulating the q burst sequences; and sending the q modulated burst sequences to a receive end.

With reference to the first aspect, in a first implementation manner of the first aspect, the coding source data to generate a first bitstream includes: coding a header part of the source data according to a modulation and coding scheme MCS; or coding a header part of the source data at a code rate of p.

With reference to the first aspect or the foregoing implementation manner of the first aspect, in a second implementation manner of the first aspect, when the header part of the source data is coded according to the modulation and coding scheme MCS, the mapping, in an interleaved manner, the second bitstream to q bursts to generate q burst sequences includes: mapping, in an interleaved manner, a data part of the second bitstream to the q bursts; and mapping, in an interleaved manner, a header part of the second bitstream to four bursts in the q bursts.

With reference to the first aspect or any one of the foregoing implementation manners of the first aspect, in a third implementation manner of the first aspect, the mapping, in an interleaved manner, a header part of the second bitstream to four bursts in the q bursts includes: mapping, in an interleaved manner, the header part of the second bitstream to the first four bursts in the q bursts; and repeatedly mapping the header part of the second bitstream to q-4 bursts except the first four bursts.

With reference to the first aspect or any one of the foregoing implementation manner of the first aspect, in a fourth implementation manner of the first aspect, when the a header part of the source data is coded at the code rate of p, the mapping, in an interleaved manner, the second bitstream to q bursts to generate q burst sequences includes: entirely mapping a header part and a data part of the second bitstream to the q bursts.

With reference to the first aspect or any one of the foregoing implementation manners of the first aspect, in a fifth implementation manner of the first aspect, the puncturing the first bitstream to generate a second bitstream includes: puncturing the first bitstream according to a puncturing rule in an MCS.

With reference to the first aspect or any one of the foregoing implementation manners of the first aspect, in a sixth implementation manner of the first aspect, the method further includes: sending indication information to the receive end, where the indication information is used to instruct the receive end to perform coding/decoding at the code rate of p.

With reference to the first aspect or any one of the foregoing implementation manners of the first aspect, in a seventh implementation manner of the first aspect, the coding at a code rate of p includes: convolutional coding at a code rate of ⅙, where a constraint length of the convolutional coding at a code rate of ⅙ is 7, and a generator polynomial is {175, 165, 151, 137, 133, 117}.

According to a second aspect, a channel decoding method for a data exchange service is provided, including: acquiring q burst sequences, where q is an integer greater than 4; and decoding the q burst sequences to generate decoding data, where a code rate of a data part of the q burst sequences is p, and p is less than ⅓.

With reference to the second aspect, in a first implementation manner of the second aspect, the q burst sequences are generated by a transmit end by performing channel coding on source data, where a header part of the q burst sequences is generated by the transmit end by coding a header part of the source data according to a modulation and coding scheme MCS, or a header part of the q burst sequences is generated by the transmit end by coding a header part of the source data at a code rate of p.

With reference to the second aspect or the foregoing implementation manner of the second aspect, in a second implementation manner of the second aspect, when the header part of the q burst sequences is generated by the transmit end by coding the header part of the source data according to the MCS, the decoding the q burst sequences to generate decoding data includes: decoding the header part of the q burst sequences according to the MCS; and decoding the data part of the q burst sequences at the code rate of p.

With reference to the second aspect or any one of the foregoing implementation manners of the second aspect, in a third implementation manner of the second aspect, the decoding the header part of the q burst sequences according to the MCS includes: decoding a header part of the first four burst sequences in the q burst sequences according to the MCS.

With reference to the second aspect or any one of the foregoing implementation manners of the second aspect, in a fourth implementation manner of the second aspect, when the header part of the q burst sequences is generated by the transmit end by coding the header part of the source data at the code rate of p, the decoding the q burst sequences to generate decoding data includes: decoding the header part and the data part of the q burst sequences at the code rate of p.

With reference to the second aspect or any one of the foregoing implementation manners of the second aspect, in a fifth implementation manner of the second aspect, before the acquiring q burst sequences, the method further includes: receiving indication information sent by the transmit end, where the indication information is used to instruct a receive end to perform decoding at the code rate of p.

With reference to the second aspect or any one of the foregoing implementation manners of the second aspect, in a sixth implementation manner of the second aspect, the coding at a code rate of p includes: convolutional coding at a code rate 1/6, where a constraint length of the convolutional coding at a code rate of ⅙ is 7, and a generator polynomial is {175, 165, 151, 137, 133, 117}.

According to a third aspect, a transmit end is provided, including: a coding unit, configured to code source data to generate a first bitstream, where a code rate of a data part of the source data is p, and p is less than ⅓; a puncturing unit, configured to puncture the first bitstream generated by the coding unit to generate a second bitstream; a mapping unit, configured to map, in an interleaved manner, the second bitstream generated by the puncturing unit to q bursts to generate q burst sequences, for modulation, where the second bitstream fully occupies each burst sequence of the q burst sequences, and q is an integer greater than 4; and a sending unit, configured to send the q modulated burst sequences to a receive end.

With reference to the third aspect, in a first implementation manner of the third aspect, the coding unit is specifically configured to: code a header part of the source data according to a modulation and coding scheme MCS; or code a header part of the source data at a code rate of p.

With reference to the third aspect or the foregoing implementation manner of the third aspect, in a second implementation manner of the third aspect, when the coding unit is specifically configured to code the header part of the source data according to the modulation and coding scheme MCS, the mapping unit is specifically configured to: map, in an interleaved manner, a data part of the second bitstream to the q bursts; and map, in an interleaved manner, a header part of the second bitstream to four bursts in the q bursts.

With reference to the third aspect or any one of the foregoing implementation manners of the third aspect, in a third implementation manner of the third aspect, the mapping unit is specifically configured to: map, in an interleaved manner, the header part of the second bitstream to the first four bursts in the q bursts; and repeatedly map the header part of the second bitstream to q-4 bursts except the first four bursts.

With reference to the third aspect or any one of the foregoing implementation manners of the third aspect, in a fourth implementation manner of the third aspect, when the coding unit is specifically configured to code the header part of the source data at the code rate of p, the mapping unit is specifically configured to: entirely map a header part and a data part of the second bitstream to the q bursts.

With reference to the third aspect or any one of the foregoing implementation manners of the third aspect, in a fifth implementation manner of the third aspect, the puncturing unit is specifically configured to: puncture, according to a puncturing rule in an MCS, the first bitstream generated by the coding unit.

With reference to the third aspect or any one of the foregoing implementation manners of the third aspect, in a sixth implementation manner of the third aspect, the sending unit is further configured to: send indication information to the receive end, where the indication information is used to instruct the receive end to perform coding/decoding at the code rate of p.

With reference to the third aspect or any one of the foregoing implementation manners of the third aspect, in a seventh implementation manner of the third aspect, the coding at a code rate of p includes: convolutional coding at a code rate of ⅙, where a constraint length of the convolutional coding at a code rate of ⅙ is 7, and a generator polynomial is {175, 165, 151, 137, 133, 117}.

According to a fourth aspect, a receive end is provided, including: an acquiring unit, configured to acquire q burst sequences, where q is an integer greater than 4; and a decoding unit, configured to decode the q burst sequences acquired by the acquiring unit to generate decoding data, where a code rate of a data part of the q burst sequences is p, and p is less than ⅓.

With reference to the fourth aspect, in a first implementation manner of the fourth aspect, the q burst sequences are generated by a transmit end by performing channel coding on source data, where a header part of the q burst sequences is generated by the transmit end by coding a header part of the source data according to a modulation and coding scheme MCS, or a header part of the q burst sequences is generated by the transmit end by coding a header part of the source data at a code rate of p.

With reference to the fourth aspect or the foregoing implementation manner of the fourth aspect, in a second implementation manner of the fourth aspect, when the header part of the q burst sequences is generated by the transmit end by coding the header part of the source data according to the modulation and coding scheme MCS, the decoding unit is specifically configured to: decode the header part of the q burst sequences according to the MCS; and decode the data part of the q burst sequences at the code rate of p.

With reference to the fourth aspect or any one of the foregoing implementation manners of the fourth aspect, in a third implementation manner of the fourth aspect, the decoding unit is specifically configured to: decode a header part of the first four burst sequences in the q burst sequences according to the MCS.

With reference to the fourth aspect or any one of the foregoing implementation manners of the fourth aspect, in a fourth implementation manner of the fourth aspect, when the header part of the q burst sequences is generated by the transmit end by coding the header part of the source data at the code rate of p, the decoding unit is specifically configured to: decode the header part and the data part of the q burst sequences at the code rate of p.

With reference to the fourth aspect or any one of the foregoing implementation manners of the fourth aspect, in a fifth implementation manner of the fourth aspect, the acquiring unit is further configured to: receive indication information sent by the transmit end, where the indication information is used to instruct the receive end to perform decoding at the code rate of p.

With reference to the fourth aspect or any one of the foregoing implementation manners of the fourth aspect, in a sixth implementation manner of the fourth aspect, the coding at a code rate of p includes: convolutional coding at a code rate of $1/6$, where a constraint length of the convolutional coding at a code rate of $1/6$ is 7, and a generator polynomial is {175, 165, 151, 137, 133, 117}.

According to a fifth aspect, a terminal device is provided, including the foregoing transmit end according to the third aspect and the foregoing receive end according to the fourth aspect.

In the embodiments of the present invention, a data part of source data is coded at a code rate of less than $1/3$, and more than four burst sequences are generated after puncturing, and mapping in an interleaved manner, which can reduce a code rate of channel coding for a data exchange service, so that reliability of terminal data transmission is ensured and power consumption of a terminal device can also be reduced, or reliability of terminal data transmission can be improved at same power consumption.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (GSM), a Code Division Multiple Access (CDMA) system, a Wideband Code Division Multiple Access (WCDMA), a general packet radio service (GPRS), and a Long Term Evolution (LTE).

User equipment (UE), also referred to as a mobile terminal, a mobile user equipment, and the like, may communicate with one or more core networks through a radio access network (RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges language and/or data with the radio access network.

A base station may be a base station (BTS, Base Transceiver Station) in the GSM or CDMA, may also be a base station (NodeB) in the WCDMA, and may further be an evolved NodeB (eNB or e-NodeB) in the LTE, which is not limited in the present invention.

Figure 1:
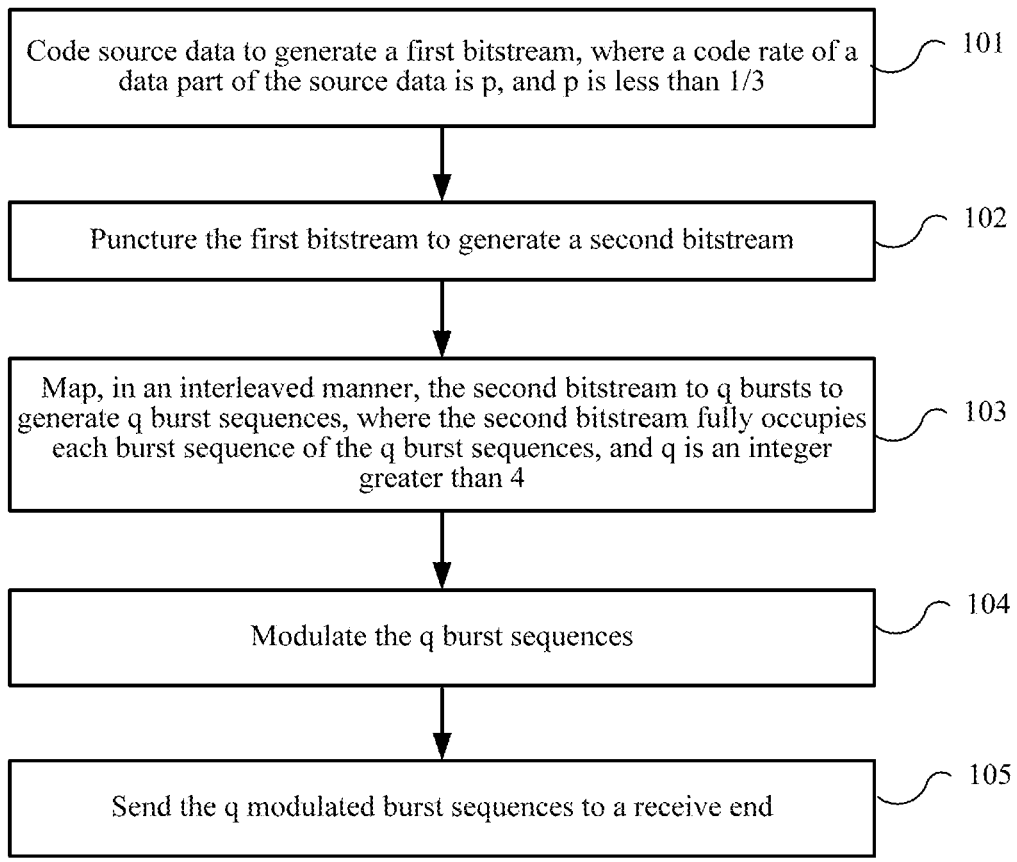
FIG. 1 is a flowchart of a channel coding method for a data exchange service according to an embodiment of the present invention.

FIG. 1 is a flowchart of a channel coding method for a data exchange service according to an embodiment of the present invention.

101: Code source data to generate a first bitstream, where a code rate of a data part of the source data is p, and p is less than $1/3$.

102: Puncture the first bitstream to generate a second bitstream.

103: Map, in an interleaved manner, the second bitstream to q bursts to generate q burst sequences, where the second bitstream fully occupies each burst sequence of the q burst sequences, and q is an integer greater than 4.

104: Modulate the q burst sequences.

105: Send the q modulated burst sequences to a receive end.

In this embodiment of the present invention, a code rate of channel coding for a data exchange service is reduced, so that reliability of terminal data transmission is ensured and power consumption of a terminal device can also be reduced, or reliability of terminal data transmission can be improved at same power consumption.

It should be understood that, the source data is a to-be-coded bitstream. A size of the source data in this embodiment of the present invention depends on a used modulation and coding scheme, and the source data includes a header (header) part and a data (data) part.

It should also be understood that, when the second bitstream is mapped, in an interleaved manner, to generate q burst sequences, the second bitstream fully occupies each burst sequence of the q burst sequences, that is, the q burst sequences are entirely filled with code words in the second bitstream, and are not filled with code words of another source.

Optionally, in an embodiment, step 101 includes: coding a header part of the source data according to a modulation and coding scheme MCS; or coding a header part of the source data at a code rate of p.

It should be understood that, the header part and the data part of the source data may be relatively separately coded, where the data part may be coded at a code rate of less than ⅓, and the header part may be coded at a code rate, which is the same as that of the data part, of less than ⅓. The header part may be coded according to a selected MCS, for example, an MCS6 is selected in advance, convolutional coding at a code rate of ⅓ is performed on the header part, and the data part is coded according to the selected MCS, that is, is still coded at a code rate of less than ⅓. In addition, the source data may also include an uplink state flag (USF). The USF may be sent in the downlink to a terminal, and is used to indicate whether the terminal is allowed to transmit data in a next period of time. Similar to the header part, the USF may also be coded according to an MCS. Still using the MCS6 as an example, a UFS of 3 bits may be coded into 36 bits.

Optionally, in an embodiment, when the header part of the source data is coded according to the modulation and coding scheme MCS, step 103 includes: mapping, in an interleaved manner, a data part of the second bitstream to the q bursts; and mapping, in an interleaved manner, a header part of the second bitstream to four bursts in the q bursts. For example, in an original coding method, the data part is coded at a code rate of ⅓, and according to the MCS, the header part is also coded at a code rate of ⅓, and a coded bitstream is punctured, and mapped, in an interleaved manner, to four bursts, for subsequent modulation, transmission, and the like. In this embodiment, when the data part is coded at a code rate of less than ⅓, for example, at a code rate of ⅙, the coded data part needs to be mapped to q bursts, where q is greater than 4. However, if the header part is still coded according to the MCS, the header part needs to be mapped only to four bursts for complete decoding.

Optionally, in an embodiment, the mapping, in an interleaved manner, a header part of the second bitstream to four bursts in the q bursts includes: mapping, in an interleaved manner, the header part of the second bitstream to the first four bursts in the q bursts; and repeatedly mapping the header part of the second bitstream to q-4 bursts except the first four bursts.

Specifically, if the header part of the second bitstream is mapped, in an interleaved manner, to the first four bursts in the q bursts, that is, no repeated mapping is performed, remaining q-4 bursts may be fully occupied by using data of the data part of the second bitstream. More specifically, when a coding end determines that no repeated mapping is performed for the header part, reduced puncturing may be correspondingly performed when the data part is punctured, that is, compared with an original puncturing manner, more data is retained, so that after being mapped in an interleaved manner, the punctured data part can fully occupy the foregoing q-4 bursts. In an embodiment, when the data part is coded at a low code rate (less than ⅓) and the header part is coded according to the MCS, the coded header part may be mapped to the first four bursts of the q bursts, and for the remaining q-4 bursts, the coded header part may be repeatedly mapped to the q-4 bursts. Correspondingly, a decoding end needs to decode only the first four bursts to obtain information about the complete header part. The header part of the remaining q-4 bursts may be used for repeated decoding, so as to improve correctness of header coding. It should be noted that, a coding manner used for the header part on which repeated mapping is performed may be the same as a coding manner used for the header part that is mapped to the first four bursts, and puncturing manners may be or may not be the same. For example, when the used coding manner is the MCS6, the header part that is mapped to the first four bursts is not punctured, and then a header part that is repeatedly mapped to the last four bursts is the same as the header part that is mapped to the first four bursts. For another example, when the used coding manner is an MCS9, the header part that is mapped to the first four bursts is punctured, and then shifted puncturing may be performed when repeated mapping of the last four bursts is performed, that is, a part, which is removed through puncturing, of the header part of the first four bursts is retained.

Optionally, in an embodiment, when the header part of the source data is coded at the code rate of p, step 103 includes: entirely mapping a header part and a data part of the second bitstream to the q bursts. For example, in an original coding method, the data part is coded at a code rate of ⅓, and according to the MCS, the header part is also coded at a code rate of ⅓, and a coded bitstream is punctured, and mapped, in an interleaved manner, to four bursts, for subsequent modulation, transmission, and the like. In this embodiment, the header part and the data part are both coded at a relatively low code rate of p, such as ⅙, the data part needs to be mapped to eight bursts, and the header part also needs to be mapped to eight bursts, so that the decoding end can correctly perform decoding.

Optionally, in an embodiment, step 102 includes: puncturing the first bitstream according to a puncturing rule in an MCS. Specifically, the first bitstream that is generated through coding at a code rate of less than ⅓ needs to be punctured, to remove some redundant bits, so as to achieve an objective of rate matching. Puncturing may be performed according to a puncturing rule in a selected MCS, that is, a puncturer in an existing MCS may be used for puncturing, which is easy to implement.

Optionally, in an embodiment, the method further includes: sending indication information to the receive end, where the indication information is used to instruct the receive end to perform coding/decoding at the code rate of p. When a transmit end performs coding at a low rate, the receive end may be notified, so that the receive end can correctly perform decoding at a correspondingly low code rate, or so that the receive end can perform subsequent coding at a correspondingly low code rate. Specifically, a spare bit in a dedicated mode or temporary block flow (Dedicated Mode or TBF) cell in an immediate assignment message (Immediate Assignment) is set to 1, to indicate that the transmit end performs coding at a low rate, and the receive end receives the indication information and therefore, can learn the code rate of the transmit end and a decoding method according to an agreement made in advance. In addition, the indication information may further be used to indicate, to the receive end, whether a coding end performs repeated mapping on a header part of a bitstream. Specifically, if the indication information indicates that repeated mapping is performed on the header part, a puncturing manner that is used for the header part on which repeated mapping is performed also needs to be indicated. If the indication information indicates that no repeated mapping is performed, a puncturing manner that is used for a data part may be indicated to the receive end, so that the receive end can correctly perform decoding. It should be understood that, the indication information that is used to indicate whether repeated mapping is performed and the indication information that is used to indicate that coding/decoding is performed at a low code rate of p may be sent together, or may be sent separately, which is not limited in the present invention.

Optionally, in an embodiment, the coding at a code rate of p includes: convolutional coding at a code rate of ⅙, where a constraint length of the convolutional coding at a code rate of ⅙ is 7, and a generator polynomial is {175, 165, 151, 137, 133, 117}. In an embodiment, the convolutional coding at a code rate of ⅙ may be used, and performance of K73 coding in which a constraint length is 7 and a generator polynomial is {175, 165, 151, 137, 133, 117} is relatively good.

In this embodiment of the present invention, data in a data exchange service is coded at a relatively low code rate (less than ⅓), that is, data transmission is performed by using more time-frequency resources, so that reliability and coverage of terminal data transmission are ensured and power consumption of a terminal device can also be reduced, or reliability and coverage of data transmission are improved in a case of same power consumption. In addition, because repeated mapping and repeated decoding may be performed on a header part of data, robustness of the header part of data can be further improved, and communication reliability can still be ensured in a poor communication environment.

For an MTC terminal device that is in a relatively poor communication environment and that is power limited, the method of this embodiment of the present invention can ensure reliability and coverage of data transmission and also reduce power consumption of the MTC terminal device, which is beneficial to maintenance of the MTC terminal device.

Figure 2:
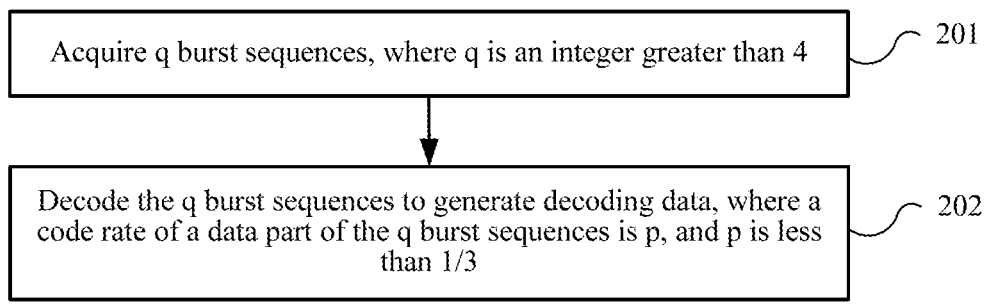
FIG. 2 is a flowchart of a channel decoding method for a data exchange service according to an embodiment of the present invention.

FIG. 2 is a flowchart of a channel decoding method for a data exchange service according to an embodiment of the present invention.

201: Acquire q burst sequences, where q is an integer greater than 4.

202: Decode the q burst sequences to generate decoding data, where a code rate of a data part of the q burst sequences is p, and p is less than ⅓.

In this embodiment of the present invention, a code rate of channel coding for a data exchange service is reduced, so that reliability of terminal data transmission is ensured and power consumption of a terminal device can also be reduced, or reliability of terminal data transmission can be improved at same power consumption.

Optionally, in an embodiment, the q burst sequences are generated by a transmit end by performing channel coding on source data, where a header part of the q burst sequences is generated by the transmit end by coding a header part of the source data according to a modulation and coding scheme MCS, or a header part of the q burst sequences is generated by the transmit end by coding a header part of the source data at a code rate of p.

It should be understood that, the source data is a to-be-coded bitstream. A size of the source data in this embodiment of the present invention depends on the used modulation and coding scheme, and the source data includes a header part and a data part. The header part and the data part of the source data may be relatively separately coded, where the data part may be coded at a code rate (that is, a code rate) of less than ⅓, and the header part may be coded at a code rate, which is the same as that of the data part, of less than ⅓; the header part may also be coded according to the used MCS, for example, an MCS6 is used, and then convolutional coding at a code rate of ⅓ is performed on the header part.

In addition, the source data may also include an uplink state flag (USF). The USF may be sent in the downlink to a terminal, and is used to indicate whether the terminal is allowed to transmit data in a next period of time. The USF may be coded according to the MCS. Still using the MCS6 as an example, a UFS of 3 bits may be coded into 36 bits.

Optionally, in an embodiment, when the header part of the q burst sequences is generated by the transmit end by coding the header part of the source data according to the modulation and coding scheme MCS, step 201 includes: decoding the header part of the q burst sequences according to the MCS, and decoding the data part of the q burst sequences at the code rate of p.

The transmit end codes the header part of the source data according to the MCS, and codes the data part at a code rate of p (less than ⅓), so as to generate q burst sequences. Therefore, the receive end needs to completely receive the q burst sequences, and then can restore the source data through decoding; specifically, the receive end may decode the header part of the q burst sequences according to the MCS, and decodes the data part of the q burst sequences at the code rate of p.

Optionally, in an embodiment, the decoding the header part of the q burst sequences according to the MCS includes: decoding a header part of the first four burst sequences in the q burst sequences according to the MCS. For example, in an original coding method, the data part is coded at a code rate of ⅓, and according to the MCS, the header part is also coded at a code rate of ⅓, and a coded bitstream is punctured, and mapped, in an interleaved manner, to four bursts, for subsequent modulation, transmission, and the like. In this embodiment, when the data part is coded at a code rate of less than ⅓, for example, at a code rate of ⅙, the coded data part needs to be mapped to q bursts, where q is greater than 4, the header part is coded according to the MCS, and the header part is mapped to the first four bursts of the q bursts. In this case, a decoding end may decode the first four burst sequences of the q burst sequences to acquire a complete header part. When a coding end maps the header part to four bursts, and repeatedly maps the header part to q-4 bursts, the decoding end can correctly decode the header part by acquiring and decoding only the first four bursts, and the decoding end may also repeatedly decode a header part of the q-4 burst sequences, to improve correctness of header part decoding.

Optionally, in an embodiment, when the header part of the q burst sequences is generated by the transmit end by coding the header part of the source data at the code rate of p, the decoding the q burst sequences to generate decoding data includes: decoding the header part and the data part of the q burst sequences at the code rate of p. For example, in an original coding method, the data part is coded at a code rate of ⅓, and according to the MCS, the header part is also coded at a code rate of ⅓, and a coded bitstream is punctured, and mapped, in an interleaved manner, to four bursts, for subsequent modulation, transmission, and the like. In this embodiment, if the header part and the data part are both coded at a relatively low code rate of p, such as ⅙, the data part is mapped to eight bursts, and the header part is mapped to the same eight bursts. In this case, the decoding end may entirely decode the eight bursts at the code rate of ⅙, to restore data of the complete header part and data part.

Optionally, in an embodiment, before step 201, the method may further include: receiving indication information sent by the transmit end, where the indication information is used to instruct a receive end to perform decoding at the code rate of p.

When the transmit end performs coding at a low rate, the receive end may receive the indication information that is sent by the transmit end and that is used to instruct the receive end to perform decoding at the code rate of p, and the indication information may also be used to instruct the receive end to perform a subsequent coding operation at the code rate of p. Specifically, a spare (Spare) bit in a dedicated mode or temporary block flow (Dedicated Mode or TBF) cell in an immediate assignment message (Immediate Assignment) is set to 1, to indicate that the transmit end performs coding at a low rate, and the receive end receives the indication information and therefore, can learn the code rate of the transmit end and a decoding method according to an agreement made in advance. In addition, the indication information may further be used to indicate, to the receive end, whether a coding end performs repeated mapping on a header part of a bitstream. Specifically, if the indication information indicates that repeated mapping is performed on the header part, a puncturing manner that is used for the header part on which repeated mapping is performed also needs to be indicated. If the indication information indicates that no repeated mapping is performed, a puncturing manner that is used for a data part may be indicated to the receive end, so that the receive end can correctly perform decoding. It should be understood that, the indication information that is used to indicate whether repeated mapping is performed and the indication information that is used to indicate that coding/decoding is performed at a low code rate of p may be sent together, or may be sent separately, which is not limited in the present invention.

Optionally, in an embodiment, the coding at a code rate of p includes: convolutional coding at a code rate of ⅙, where a constraint length of the convolutional coding at a code rate of ⅙ is 7, and a generator polynomial is {175, 165, 151, 137, 133, 117}. In an embodiment, the convolutional coding at a code rate of ⅙ may be used, and performance of K73 coding in which a constraint length is 7 and a generator polynomial is {175, 165, 151, 137, 133, 117} is relatively good.

In this embodiment of the present invention, data in a data exchange service is coded at a relatively low code rate (less than ⅓), that is, data transmission is performed by using more time-frequency resources, so that reliability and coverage of terminal data transmission are ensured and power consumption of a terminal device can also be reduced, or reliability and coverage of data transmission are improved in a case of same power consumption. In addition, because repeated mapping and repeated decoding may be performed on a header part of data, robustness of the header part of data can be further improved, and communication reliability can still be ensured in a poor communication environment.

For an MTC terminal device that is in a relatively poor communication environment and that is power limited, the method of this embodiment of the present invention can ensure reliability and coverage of data transmission and also reduce power consumption of the MTC terminal device, which is beneficial to maintenance of the MTC terminal device.

Figure 3:
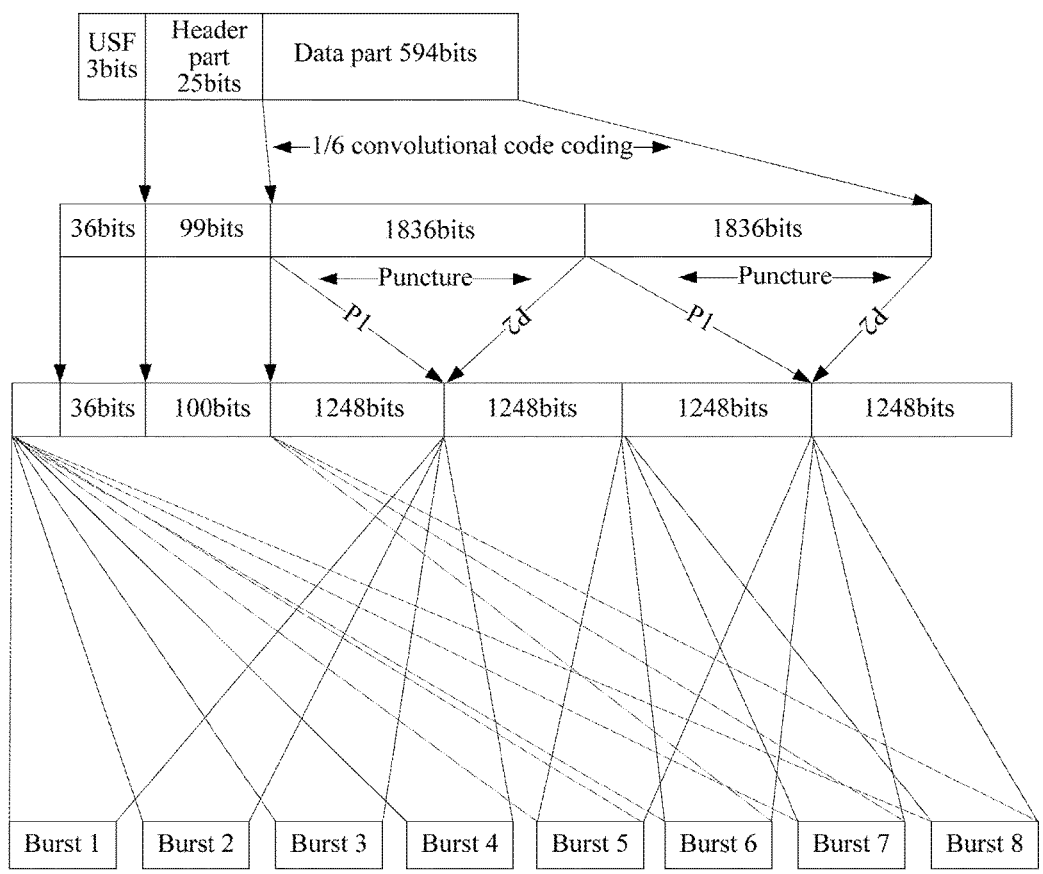
FIG. 3 is a schematic diagram of channel coding according to an embodiment of the present invention.

FIG. 3 is a schematic diagram of channel coding according to an embodiment of the present invention.

As an example, FIG. 3 shows a channel coding process of this embodiment of the present invention by using an example. Source data includes an uplink state flag (USF) of 3 bits, a header part of 25 bits, and a data part of 594 Bits. The USF of 3 bits is coded and becomes a USF of 36 bits, the header part of 25 bits becomes a header part of 33 bits after parity bits of 8 bits is added to the header part, and parity bits of 12 bits and tail bits of 6 bits are first added to the data part of 594 bits, that is, a length of the data part actually input to a coder is 612 bits.

The USF and the header part are coded according to an MCS6. The USF of 3 bits is coded and becomes a USF of 36 bits, and the header part of 33 bits becomes a header part of 99 bits after ⅓ coding. The data part is coded by using a ⅙ convolutional code (a data part in the MCS6 is coded at a code rate of ⅓) to obtain a first bitstream, where a data part of the first bitstream is 3672 bits (twice of a result of the coding at a code rate of ⅓).

The first bitstream is punctured to generate a second bitstream. Specifically, the first 1836 bits and the last 1836 bits of the data part are separately punctured by using a puncturing rule in the MCS6, to obtain several code groups, and different code groups carry same valid payload and different redundancy information.

The second bitstream is mapped, in an interleaved manner, to eight bursts, where because the header part is coded by using a corresponding coding method in the MCS6, the header part needs only four bursts to complete mapping, while the data part needs eight bursts to complete mapping. Therefore, after the header part is mapped to the first four bursts, the header part may be repeatedly mapped to the last four bursts, so that a decoding end performs repeated decoding on the header part, which can improve correctness of coding. As shown in FIG. 3, the header part and a part P1 of data after puncturing may be completely mapped to the first four bursts (bursts 1 to 4), where the part P1 of the data is a code group obtained after puncturing, valid payload carried by P1 is the same as valid payload carried by P2, and redundancy information carried by P1 is different from redundancy information carried by P2. For the last four bursts (bursts 5 to 8), a dashed line represents that the header part is repeatedly mapped to the four bursts, and a second part P1 of data may be mapped to the four bursts.

In addition, for the header part, same as the data part, a convolutional code at a code rate of ⅙ may also be used. In this way, the header part needs eight bursts to complete mapping.

Correspondingly, the decoding end needs to completely receive data of the eight bursts to correctly perform decoding.

Figure 4:
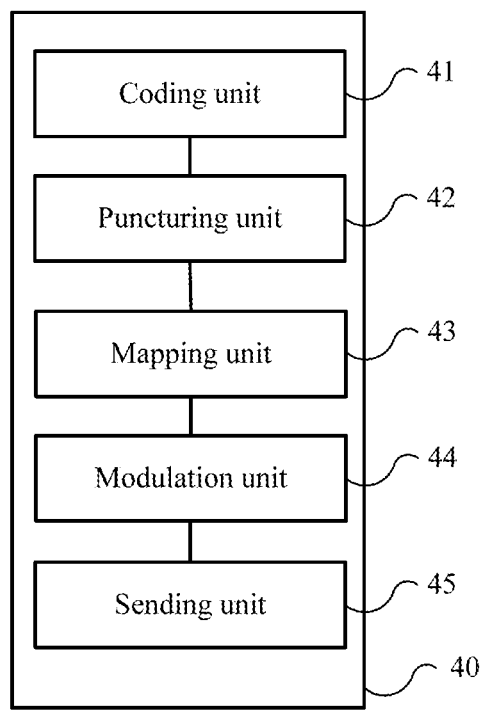
FIG. 4 is a schematic block diagram of a transmit end according to an embodiment of the present invention.

FIG. 4 is a schematic block diagram of a transmit end according to an embodiment of the present invention. The transmit end 40 of FIG. 4 includes a coding unit 41, a puncturing unit 42, a mapping unit 43, a modulation unit 44, and a sending unit 45.

The coding unit 41 codes source data to generate a first bitstream, where a code rate of a data part of the source data is p, and p is less than ⅓. The puncturing unit 42 punctures the first bitstream generated by the coding unit 41 to generate a second bitstream. The mapping unit 43 maps, in an interleaved manner, the second bitstream generated by the puncturing unit 42 to q bursts to generate q burst sequences, where the second bitstream fully occupies each burst sequence of the q burst sequences, and q is an integer greater than 4. The modulation unit 44 modulates the q burst sequences. The sending unit 45 sends the q modulated burst sequences to a receive end.

In this embodiment of the present invention, a code rate of channel coding for a data exchange service is reduced, so that reliability of terminal data transmission is ensured and power consumption of a terminal device can also be reduced, or reliability of terminal data transmission can be improved at same power consumption.

It should be understood that, the source data is a to-be-coded bitstream. A size of the source data in this embodiment of the present invention depends on a used modulation and coding scheme, and the source data includes a header (header) part and a data (data) part.

It should also be understood that, when the second bitstream is mapped, in an interleaved manner, to generate q burst sequences, the second bitstream fully occupies each burst sequence of the q burst sequences, that is, the q burst sequences are entirely filled with code words in the second bitstream, and are not filled with code words of another source.

Optionally, in an embodiment, the coding unit 41 is specifically configured to: code a header part of the source data according to a modulation and coding scheme MCS; or code a header part of the source data at a code rate of p.

It should be understood that, the header part and the data part of the source data may be relatively separately coded, where the coding unit 41 may code the data part at a code rate (that is, a code rate) of less than ⅓, and may code the header part at a code rate, which is the same as that of the data part, of less than ⅓; the coding unit 41 may also code the header part according to the used MCS, for example, an MCS6 is used, and then the coding unit 41 performs convolutional coding on the header part at a code rate of ⅓. In addition, the source data may also include an uplink state flag (USF). The USF may be sent in the downlink to a terminal, and is used to indicate whether the terminal is allowed to transmit data in a next period of time. Similar to the header part, the USF may also be coded according to an MCS. Still using the MCS6 as an example, a UFS of 3 bits may be coded into 36 bits.

Optionally, in an embodiment, when the coding unit is specifically configured to code the header part of the source data according to the modulation and coding scheme MCS, the mapping unit 43 is specifically configured to: map, in an interleaved manner, a data part of the second bitstream to the q bursts; and map, in an interleaved manner, a header part of the second bitstream to four bursts in the q bursts. For example, in an original coding method, the data part is coded at a code rate of ⅓, and according to the MCS, the header part is also coded at a code rate of ⅓, and a coded bitstream is punctured, and mapped, in an interleaved manner, to four bursts, for subsequent modulation, transmission, and the like. In this embodiment, when the data part is coded at a code rate of less than ⅓, for example, at a code rate of ⅙, the coded data part needs to be mapped to q bursts by the mapping unit 43, where q is greater than 4. However, if the header part is still coded according to the MCS, the header part needs to be mapped only to four bursts by the mapping unit 43 for complete decoding.

Optionally, in an embodiment, the mapping unit 43 is specifically configured to: map, in an interleaved manner, the header part of the second bitstream to the first four bursts in the q bursts; and repeatedly map the header part of the second bitstream to q-4 bursts except the first four bursts. Specifically, in an embodiment, when the data part is coded at a low code rate (less than ⅓) and the header part is coded according to the MCS, the coded header part may be mapped to the first four bursts of the q bursts by the mapping unit 43, and for the remaining q-4 bursts, the coded header part may be repeatedly mapped to the q-4 bursts by the mapping unit 43. Correspondingly, a decoding end needs to decode only the first four bursts to obtain information about the complete header part. The header part of the remaining q-4 bursts may be used for repeated decoding, so as to improve correctness of header coding. It should be noted that, a coding manner used for the header part on which repeated mapping is performed may be the same as a coding manner used for the header part that is mapped to the first four bursts, and puncturing manners may be or may not be the same. For example, when the used coding manner is the MCS6, the header part that is mapped to the first four bursts is not punctured, and then a header part that is repeatedly mapped to the last four bursts is the same as the header part that is mapped to the first four bursts. For another example, when the used coding manner is an MCS9, the header part that is mapped to the first four bursts is punctured, and then shifted puncturing may be performed when repeated mapping of the last four bursts is performed, that is, a part, which is removed through puncturing, of the header part of the first four bursts is retained.

Optionally, in an embodiment, when the coding unit 41 is specifically configured to code the header part of the source data at the code rate of p, the mapping unit 43 is specifically configured to: entirely map a header part and a data part of the second bitstream to the q bursts. For example, in an original coding method, the data part is coded at a code rate of ⅓, and according to the MCS, the header part is also coded at a code rate of ⅓, and a coded bitstream is punctured, and mapped, in an interleaved manner, to four bursts, for subsequent modulation, transmission, and the like. In this embodiment, the header part and the data part are both coded at a relatively low code rate of p, such as ⅙, the data part needs to be mapped to eight bursts by the mapping unit 43, and the header part also needs to be mapped to eight bursts by the mapping unit 43, so that the decoding end can correctly perform decoding.

Optionally, in an embodiment, the puncturing unit 42 is specifically configured to: puncture, according to a puncturing rule in an MCS, the first bitstream generated by the coding unit. Specifically, the first bitstream that is generated through coding at a code rate of less than ⅓ needs to be punctured, to remove some redundant bits, so as to achieve an objective of rate matching. Puncturing may be performed according to a puncturing rule in a selected MCS.

Optionally, in an embodiment, the sending unit 45 is further configured to: send indication information to the receive end, where the indication information is used to instruct the receive end to perform coding/decoding at the code rate of p. When the transmit end 40 performs coding at a low rate, the receive end may be notified, so that the receive end can correctly perform decoding at a correspondingly low code rate, or so that the receive end can perform subsequent coding at a correspondingly low code rate. Specifically, a spare (Spare) bit in a dedicated mode or temporary block flow (Dedicated Mode or TBF) cell in an immediate assignment message (Immediate Assignment) is set to 1, to indicate that the transmit end performs coding at a low rate, and the receive end receives the indication information and therefore, can learn the code rate of the transmit end and a decoding method according to an agreement made in advance. In addition, the indication information may further be used to indicate, to the receive end, whether a coding end performs repeated mapping on a header part of a bitstream. Specifically, if the indication information indicates that repeated mapping is performed on the header part, a puncturing manner that is used for the header part on which repeated mapping is performed also needs to be indicated. If the indication information indicates that no repeated mapping is performed, a puncturing manner that is used for a data part may be indicated to the receive end, so that the receive end can correctly perform decoding. It should be understood that, the indication information that is used to indicate whether repeated mapping is performed and the indication information that is used to indicate that coding/decoding is performed at a low code rate of p may be sent together, or may be sent separately, which is not limited in the present invention.

Optionally, in an embodiment, the coding at a code rate of p includes: convolutional coding at a code rate of ⅙, where a constraint length of the convolutional coding at a code rate of ⅙ is 7, and a generator polynomial is {174, 164, 141, 137, 133, 117}. In an embodiment, the convolutional coding at a code rate of ⅙ may be used, and performance of K73 coding in which a constraint length is 7 and a generator polynomial is {174, 164, 141, 137, 133, 117} is relatively good.

The transmit end 40 in this embodiment of the present invention codes data in a data exchange service at a relatively low code rate (less than ⅓), that is, performs data transmission by using more time-frequency resources, so that reliability and coverage of terminal data transmission are ensured and power consumption of a terminal device can also be reduced, or reliability and coverage of data transmission are improved in a case of same power consumption. In addition, because repeated mapping and repeated decoding may be performed on a header part of data, robustness of the header part of data can be further improved, and communication reliability can still be ensured in a poor communication environment.

For an MTC terminal device that is in a relatively poor communication environment and that is power limited, the method of this embodiment of the present invention can ensure reliability and coverage of data transmission and also reduce power consumption of the MTC terminal device, which is beneficial to maintenance of the MTC terminal device.

Figure 5:
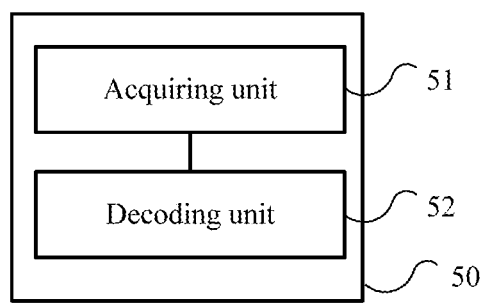
FIG. 5 is a schematic block diagram of a receive end according to an embodiment of the present invention.

FIG. 5 is a schematic block diagram of a receive end according to an embodiment of the present invention. The receive end 50 of FIG. 5 includes an acquiring unit 51 and a decoding unit 52.

The acquiring unit 51 acquires q burst sequences, where q is an integer greater than 4. The decoding unit 52 decodes the q burst sequences acquired by the acquiring unit 51 to generate decoding data, where a code rate of a data part of the q burst sequences is p, and p is less than ⅓.

In this embodiment of the present invention, a code rate of channel coding for a data exchange service is reduced, so that reliability of terminal data transmission is ensured and power consumption of a terminal device can also be reduced, or reliability of terminal data transmission can be improved at same power consumption.

Optionally, in an embodiment, the q burst sequences are generated by a transmit end by performing channel coding on source data, where a header part of the q burst sequences is generated by the transmit end by coding a header part of the source data according to a modulation and coding scheme MCS, or a header part of the q burst sequences is generated by the transmit end by coding a header part of the source data at a code rate of p.

It should be understood that, the source data is a to-be-coded bitstream. A size of the source data in this embodiment of the present invention depends on the used modulation and coding scheme, and the source data includes a header part and a data part. The header part and the data part of the source data may be relatively separately coded, where the data part may be coded at a code rate (that is, a code rate) of less than ⅓, and the header part may be coded at a code rate, which is the same as that of the data part, of less than ⅓; the header part may also be coded according to the used MCS, for example, an MCS6 is used, and then convolutional coding at a code rate of ⅓ is performed on the header part. In addition, the source data may also include an uplink state flag (USF). The USF may be sent in the downlink to a terminal, and is used to indicate whether the terminal is allowed to transmit data in a next period of time. The USF may be coded according to the MCS. Still using the MCS6 as an example, a UFS of 3 bits may be coded into 36 bits.

Optionally, in an embodiment, when the header part of the q burst sequences is generated by the transmit end by coding the header part of the source data according to the modulation and coding scheme MCS, the decoding unit 52 is specifically configured to: decode the header part of the q burst sequences according to the MCS; and decode the data part of the q burst sequences at the code rate of p.

The transmit end codes the header part of the source data according to the MCS, and codes the data part at a code rate of p (less than ⅓), so as to generate q burst sequences. Therefore, the receive end 50 needs to completely acquire the q burst sequences by using the acquiring unit 51, and then can restore the source data by using the decoding unit 52; specifically, the decoding unit 52 may decode the header part of the q burst sequences according to the MCS, and decodes the data part of the q burst sequences at the code rate of p.

Optionally, in an embodiment, the decoding unit 52 is specifically configured to: decode a header part of the first four burst sequences in the q burst sequences according to the MCS. For example, in an original coding method, the data part is coded at a code rate of ⅓, and according to the MCS, the header part is also coded at a code rate of ⅓, and a coded bitstream is punctured, and mapped, in an interleaved manner, to four bursts, for subsequent modulation, transmission, and the like. In this embodiment, when the data part is coded at a code rate of less than ⅓, for example, at a code rate of ⅙, the coded data part needs to be mapped to q bursts, where q is greater than 4, the header part is coded according to the MCS, and the header part is mapped to the first four bursts of the q bursts. In this case, a receive end 50 may decode, by using the decoding unit 52, the first four burst sequences of the q burst sequences to acquire a complete header part. When a coding end maps the header part to four bursts, and repeatedly maps the header part to q-4 bursts, the decoding end can correctly decode the header part by acquiring and decoding only the first four bursts, and the decoding end may also repeatedly decode a header part of the q-4 burst sequences, to improve correctness of header part decoding.

Optionally, in an embodiment, when the header part of the q burst sequences is generated by the transmit end by coding the header part of the source data at the code rate of p, the decoding unit 52 is specifically configured to: decode the header part and the data part of the q burst sequences at the code rate of p. For example, in an original coding method, the data part is coded at a code rate of ⅓, and according to the MCS, the header part is also coded at a code rate of ⅓, and a coded bitstream is punctured, and mapped, in an interleaved manner, to four bursts, for subsequent modulation, transmission, and the like. In this embodiment, if the header part and the data part are both coded at a relatively low code rate of p, such as ⅙, the data part is mapped to eight bursts, and the header part is mapped to the same eight bursts. In this case, the decoding end 50 may entirely decode the eight bursts at the code rate of ⅙ by using the decoding unit 52, to restore data of the complete header part and data part.

Optionally, in an embodiment, the acquiring unit 51 is further configured to: receive indication information sent by the transmit end, where the indication information is used to instruct the receive end to perform decoding at the code rate of p.

When the transmit end performs coding at a low rate, the receive end 50 may receive, by using the acquiring unit 51, the indication information that is sent by the transmit end and that is used to instruct the receive end to perform decoding at the code rate of p, and the indication information may also be used to instruct the receive end 50 to perform a subsequent coding operation at the code rate of p. Specifically, a spare (Spare) bit in a dedicated mode or temporary block flow (Dedicated Mode or TBF) cell in an immediate assignment message (Immediate Assignment) is set to 1, to indicate that the transmit end performs coding at a low rate, and the receive end 50 receives the indication information and therefore, can learn the code rate of the transmit end and a decoding method according to an agreement made in advance. In addition, the indication information may further be used to indicate, to the receive end, whether a coding end performs repeated mapping on a header part of a bitstream. Specifically, if the indication information indicates that repeated mapping is performed on the header part, a puncturing manner that is used for the header part on which repeated mapping is performed also needs to be indicated. If the indication information indicates that no repeated mapping is performed, a puncturing manner that is used for a data part may be indicated to the receive end, so that the receive end can correctly perform decoding. It should be understood that, the indication information that is used to indicate whether repeated mapping is performed and the indication information that is used to indicate that coding/decoding is performed at a low code rate of p may be sent together, or may be sent separately, which is not limited in the present invention.

Optionally, in an embodiment, the coding at a code rate of p includes: convolutional coding at a code rate of $\frac{1}{6}$, where a constraint length of the convolutional coding at a code rate of $\frac{1}{6}$ is 7, and a generator polynomial is {175, 165, 151, 137, 133, 117}. In an embodiment, the convolutional coding at a code rate of $\frac{1}{6}$ may be used, and performance of K73 coding in which a constraint length is 7 and a generator polynomial is {175, 165, 151, 137, 133, 117} is relatively good.

The decoding end 50 in this embodiment of the present invention codes/decodes data in a data exchange service at a relatively low code rate (less than $\frac{1}{3}$), that is, performs data transmission by using more time-frequency resources, so that reliability and coverage of terminal data transmission are ensured and power consumption of a terminal device can also be reduced, or reliability and coverage of data transmission are improved in a case of same power consumption. In addition, because repeated mapping and repeated decoding may be performed on a header part of data, robustness of the header part of data can be further improved, and communication reliability can still be ensured in a poor communication environment.

For an MTC terminal device that is in a relatively poor communication environment and that is power limited, the method of this embodiment of the present invention can ensure reliability and coverage of data transmission and also reduce power consumption of the MTC terminal device, which is beneficial to maintenance of the MTC terminal device.

It should be understood that, the transmit end 40 shown in FIG. 4 and the receive end 50 shown in FIG. 5 may be coupled in one device to become a terminal device that has both coding/decoding capabilities and sending and receiving capabilities.

Figure 6:
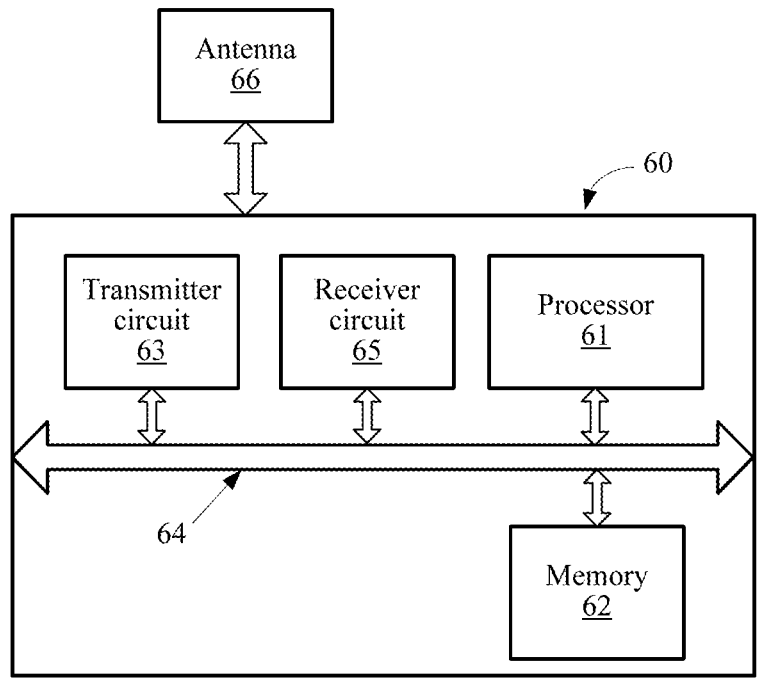
FIG. 6 is a schematic block diagram of a terminal device according to an embodiment of the present invention.

FIG. 6 is a schematic block diagram of a terminal device according to an embodiment of the present invention. The device 60 of FIG. 6 includes a processor 61, a memory 62, and a transmitter circuit 63. The processor 61, the memory 62, and the transmitter circuit 63 are connected by using a bus system 64.

The memory 62 is configured to store instructions that enable the processor 61 to execute the following operations: coding source data to generate a first bitstream, where a code rate of a data part of the source data is p, and p is less than $\frac{1}{3}$; puncturing the first bitstream to generate a second bitstream; mapping, in an interleaved manner, the second bitstream to q bursts to generate q burst sequences, where the second bitstream fully occupies each burst sequence of the q burst sequences, and q is an integer greater than 4; modulating the q burst sequences; and sending the q modulated burst sequences to a receive end by using the transmitter circuit 63.

In this embodiment of the present invention, a code rate of channel coding for a data exchange service is reduced, so that reliability of terminal data transmission is ensured and power consumption of a terminal device can also be reduced, or reliability of terminal data transmission can be improved at same power consumption.

In addition, the device 60 may further include a receiver circuit 65, an antenna 66, and the like. The processor 61 controls an operation of the device 60. The processor 61 may also be referred to as a CPU (Central Processing Unit, central processing unit). The memory 62 may include a read only memory and a random access memory, and provides instructions and data to the processor 61. A part of the memory 62 may further include a non-volatile random access memory (NVRAM). In a specific application, the transmitter circuit 63 and the receiver circuit 65 may be coupled to the antenna 66. Components of the device 60 are coupled together by using the bus system 64, where in addition to a data bus, the bus system 64 may include a power bus, a control bus, a status signal bus, and the like. However, for the purpose of clear description, various types of buses are marked as the bus system 64 in the figure.

The methods disclosed in the foregoing embodiments of the present invention may be applied to the processor 61, or are implemented by the processor 61. The processor 61 may be an integrated circuit chip, and has a signal processing capability. In an implementation process, steps of the foregoing methods may be performed by using an integrated logic circuit of hardware in the processor 61 or an instruction in a form of software. The processor 61 may be a general purpose processor, a digital signal processor (DSP), an application-specific integrated circuit (ASIC), a field programmable gate array (FPGA), or another programmable logic device, discrete gate or transistor logical device, and discrete hardware component. The processor 61 may implement or execute methods, steps, and logical block diagrams disclosed in the embodiments of the present invention. The general purpose processor may be a microprocessor, or the processor may be any conventional processor, or the like. Steps of the methods disclosed with reference to the embodiments of the present invention may be directly executed and completed by a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 62. The processor 61 reads information in the memory 62, and completes the steps of the foregoing methods in combination with hardware of the processor 61.

It should be understood that, the device 60 in this embodiment of the present invention may perform all steps in the foregoing method embodiments.

Optionally, in an embodiment, the processor 61 is specifically configured to: code a header part of the source data according to a modulation and coding scheme MCS; or code a header part of the source data at a code rate of p.

Optionally, in an embodiment, when the header part of the source data is coded according to the modulation and coding scheme MCS, the mapping, in an interleaved manner, the second bitstream to q bursts to generate q burst sequences includes: mapping, in an interleaved manner, a data part of the second bitstream to the q bursts; and mapping, in an interleaved manner, a header part of the second bitstream to four bursts in the q bursts.

Optionally, in an embodiment, the mapping, in an interleaved manner, a header part of the second bitstream to four bursts in the q bursts includes: mapping, in an interleaved manner, the header part of the second bitstream to the first four bursts in the q bursts; and repeatedly mapping the header part of the second bitstream to q-4 bursts except the first four bursts.

Optionally, in an embodiment, when the header part of the source data is coded at the code rate of p, the mapping, in an interleaved manner, the second bitstream to q bursts to generate q burst sequences includes: entirely mapping a header part and a data part of the second bitstream to the q bursts.

Optionally, in an embodiment, the puncturing the first bitstream to generate a second bitstream includes: puncturing the first bitstream according to a puncturing rule in an MCS.

Optionally, in an embodiment, the transmitter circuit 63 is specifically configured to: send indication information to the receive end, where the indication information is used to instruct the receive end to perform coding/decoding at the code rate of p.

The device 60 in this embodiment of the present invention codes data in a data exchange service at a relatively low code rate (less than ⅓), that is, performs data transmission by using more time-frequency resources, so that reliability and coverage of terminal data transmission are ensured and power consumption of a terminal device can also be reduced, or reliability and coverage of data transmission are improved in a case of same power consumption.

Figure 7:
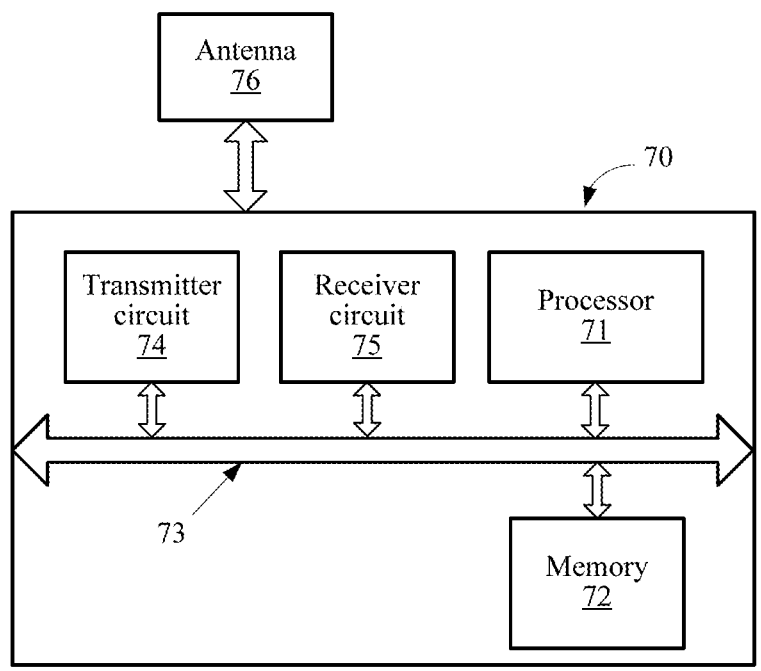
FIG. 7 is a schematic block diagram of a terminal device according to another embodiment of the present invention.

FIG. 7 is a schematic block diagram of a terminal device according to another embodiment of the present invention. The device 70 of FIG. 7 includes a processor 71 and a memory 72. The processor 71 and the memory 72 are connected by using a bus system 73.

The memory 72 is configured to store instructions that enables the processor 71 to execute the following operations: acquiring q burst sequences, where q is an integer greater than 4; and decoding the q burst sequences to generate decoding data, where a code rate of a data part of the q burst sequences is p, and p is less than ⅓.

In this embodiment of the present invention, a code rate of channel coding for a data exchange service is reduced, so that reliability of terminal data transmission is ensured and power consumption of a terminal device can also be reduced, or reliability of terminal data transmission can be improved at same power consumption.

In addition, the device 70 may further include a transmitter circuit 74, a receiver circuit 75, an antenna 76, and the like. The processor 71 controls an operation of the device 70. The processor 71 may also be referred to as a CPU (Central Processing Unit, central processing unit). The memory 72 may include a read only memory and a random access memory, and provides instructions and data to the processor 71. A part of the memory 72 may further include a non-volatile random access memory (NVRAM). In a specific application, the transmitter circuit 74 and the receiver circuit 75 may be coupled to the antenna 76. Components of the device 70 are coupled together by using the bus system 73, where in addition to a data bus, the bus system 73 may include a power bus, a control bus, a status signal bus, and the like. However, for the purpose of clear description, various types of buses are marked as the bus system 73 in the figure.

The methods disclosed in the foregoing embodiments of the present invention may be applied to the processor 71, or are implemented by the processor 71. The processor 71 may be an integrated circuit chip, and has a signal processing capability. In an implementation process, steps of the foregoing methods may be performed by using an integrated logic circuit of hardware in the processor 71 or an instruction in a form of software. The processor 71 may be a general purpose processor, a digital signal processor (DSP), an application-specific integrated circuit (ASIC), a field programmable gate array (FPGA), or another programmable logic device, discrete gate or transistor logical device, and discrete hardware component. The processor 71 may implement or execute methods, steps, and logical block diagrams disclosed in the embodiments of the present invention. The general purpose processor may be a microprocessor, or the processor may be any conventional processor, or the like. Steps of the methods disclosed with reference to the embodiments of the present invention may be directly executed and completed by a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 72. The processor 71 reads information in the memory 72, and completes the steps of the foregoing methods in combination with hardware of the processor 61.

It should be understood that, the device 70 in this embodiment of the present invention may perform all steps in the foregoing method embodiments.

Optionally, in an embodiment, the q burst sequences are generated by a transmit end by performing channel coding on source data, where a header part of the q burst sequences is generated by the transmit end by coding a header part of the source data according to a modulation and coding scheme MCS, or a header part of the q burst sequences is generated by the transmit end by coding a header part of the source data at a code rate of p.

Optionally, in an embodiment, when the header part of the q burst sequences is generated by the transmit end by coding the header part of the source data according to the MCS, the decoding the q burst sequences to generate decoding data includes: decoding the header part of the q burst sequences according to the MCS; and decoding the data part of the q burst sequences at the code rate of p.

Optionally, in an embodiment, the decoding the header part of the q burst sequences according to the MCS includes: decoding a header part of the first four burst sequences in the q burst sequences according to the MCS.

Optionally, in an embodiment, when the header part of the q burst sequences is generated by the transmit end by coding the header part of the source data at the code rate of p, the decoding the q burst sequences to generate decoding data includes: decoding the header part and the data part of the q burst sequences at the code rate of p.

Optionally, in an embodiment, before the acquiring q burst sequences, the method further includes: receiving indication information sent by the transmit end, where the indication information is used to instruct a receive end to perform decoding at the code rate of p.

The device 70 in this embodiment of the present invention codes/decodes data in a data exchange service at a relatively low code rate (less than ⅓), that is, performs data transmission by using more time-frequency resources, so that reliability and coverage of terminal data transmission are ensured and power consumption of a terminal device can also be reduced, or reliability and coverage of data transmission are improved in a case of same power consumption.

It should be understood that, the device 60 shown in FIG. 6 and the device 70 shown in FIG. 7 may be coupled in one device to become a terminal device that has both coding/decoding capabilities and sending and receiving capabilities.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

Methods or steps described in the embodiments disclosed in this specification may be implemented by hardware, a software program executed by a processor, or a combination thereof. The software program may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The present invention is described in detail with reference to the accompany drawings and in combination with the exemplary embodiments, but the present invention is not limited thereto. Various equivalent modifications or replacements can be made to the embodiments of the present invention by a person of ordinary skill in the art without departing from the spirit and essence of the present invention, and the modifications or replacements shall fall within the scope of the present invention.

What is claimed is:

1. A channel coding method for a data exchange service, the method comprising:
    coding, by a processor of a device, source data to generate a first bitstream, the source data comprising a header part and a data part, coding the source data to generate the first bit stream comprising coding the header part of the first bitstream and the data part of the first bitstream, wherein a code rate of the data part of the source data is p, p being less than ⅓, and wherein the header part of the source data is coded according to a modulation and coding scheme (MCS), a code rate of the header part being different than p;
    puncturing, by the processor of the device, the first bitstream to generate a second bitstream;
    mapping, in an interleaved manner and by the processor of the device, the second bitstream to q bursts to generate q burst sequences, the second bitstream fully occupying each burst sequence of the q burst sequences, q being an integer greater than 4, wherein mapping, in an interleaved manner, the second bitstream to q bursts to generate q burst sequences comprises:
        mapping, in an interleaved manner, a data part of the second bitstream to the q bursts;
        mapping, in an interleaved manner, a header part of the second bitstream to a first four bursts in the q bursts; and
        repeatedly mapping, in an interleaved manner, the header part of the second bitstream to a remaining q minus four bursts in the q bursts;
    modulating, by the processor of the device, the q burst sequences; and
    sending, using a transmit circuit of the device, the q modulated burst sequences to a receive end.

2. The method according to claim 1, wherein the puncturing the first bitstream to generate a second bitstream comprises puncturing the first bitstream according to a puncturing rule in an MCS.

3. The method according to claim 1, wherein the coding at a code rate of p comprises convolutional coding at a code rate of ⅙, wherein a constraint length of the convolutional coding at a code rate of ⅙ is 7, and a generator polynomial is {175, 165, 151, 137, 133, 117}.

4. A channel decoding method for a data exchange service, the method comprising:
    acquiring, by a processor of a device, q burst sequences, wherein q is an integer greater than 4, the q burst sequences having been generated by a transmitting device and comprising:
        a data part of source data coded, by the transmitting device, at a code rate of p, p being less than ⅓, and mapped, by the transmitting device in an interleaved manner, to the q bursts; and
        a header part of the source data coded, by the transmitting device, according to a modulation and coding scheme (MCS), a code rate of the header part being different than p, and mapped, by the transmitting device in an interleaved manner to a first four bursts in the q bursts and repeatedly mapped, by the transmitting device in an interleaved manner, to a remaining q minus four bursts in the q bursts; and
    decoding, by the processor of the device, the q burst sequences to generate decoding data, wherein the code rate of the data part of the q burst sequences is p.

5. The method according to claim 4, wherein decoding the q burst sequences to generate decoding data comprises:
    decoding the header part of the q burst sequences according to the MCS; and
    decoding the data part of the q burst sequences at the code rate of p.

6. The method according to claim 4, wherein the coding at a code rate of p comprises convolutional coding at a code rate of ⅙, wherein a constraint length of the convolutional coding at a code rate of ⅙ is 7, and a generator polynomial is {175, 165, 151, 137, 133, 117}.

7. A terminal device, comprising:
a transmitter circuit;
a processor; and
a memory storing instructions that are configured to, when executed by the processor, cause the processor to perform operations comprising:
  coding source data to generate a first bitstream, the source data comprising a header part and a data part, coding the source data to generate the first bit stream comprising coding the header part of the first bitstream and the data part of the first bitstream, wherein a code rate of the data part of the source data is p, p being less than ⅓, and wherein the header part of the source data is coded according to a modulation and coding scheme (MCS), a code rate of the header part being different than p;
  puncturing the first bitstream to generate a second bitstream;
  mapping, in an interleaved manner, the second bitstream to q bursts to generate q burst sequences, the second bitstream fully occupying each burst sequence of the q burst sequences, and q being an integer greater than 4, wherein mapping, in an interleaved manner, the second bitstream to q bursts to generate q burst sequences comprises:
    mapping, in an interleaved manner, a data part of the second bitstream to the q bursts;
    mapping, in an interleaved manner, a header part of the second bitstream to a first four bursts in the q bursts; and
    repeatedly mapping, in an interleaved manner, the header part of the second bitstream to a remaining q minus four bursts in the q bursts;
  modulating the q burst sequences; and
  sending the q modulated burst sequences to a receive end by using the transmitter circuit.

8. The terminal device according to claim 7, wherein the puncturing the first bitstream to generate a second bitstream comprises puncturing the first bitstream according to a puncturing rule in an MCS.

9. The terminal device according to claim 7, wherein the coding at a code rate of p comprises convolutional coding at a code rate of ⅙, wherein a constraint length of the convolutional coding at a code rate of ⅙ is 7, and a generator polynomial is {175, 165, 151, 137, 133, 117}.

10. A terminal device, comprising:
a processor; and
a memory storing instructions that are configured to, when executed by the processor, cause the processor to perform operations comprising:
  acquiring q burst sequences, wherein q is an integer greater than 4, the q burst sequences having been generated by a transmitting device and comprising:
    a data part of source data coded, by the transmitting device, at a code rate of p, p being less than ⅓, and mapped, by the transmitting device in an interleaved manner, to the q bursts; and
    a header part of the source data coded, by the transmitting device, according to a modulation and coding scheme (MCS), a code rate of the header part being different than p, and mapped, by the transmitting device in an interleaved manner to a first four bursts in the q bursts and repeatedly mapped, by the transmitting device in an interleaved manner, to a remaining q minus four bursts in the q bursts; and
  decoding the q burst sequences to generate decoding data, wherein the code rate of the data part of the q burst sequences is p.

11. The terminal device according to claim 10, wherein decoding the q burst sequences to generate decoding data comprises:
  decoding the header part of the q burst sequences according to the MCS; and
  decoding the data part of the q burst sequences at the code rate of p.

12. The terminal device according to claim 10, wherein the coding at a code rate of p comprises convolutional coding at a code rate of ⅙, wherein a constraint length of the convolutional coding at a code rate of ⅙ is 7, and a generator polynomial is {175, 165, 151, 137, 133, 117}.

* * * * *